June 13, 1939.                F. C. BUCHANAN                 2,162,367
                     COMBINATION TANK AND DELIVERY BODY
                        Filed Dec. 9, 1937      3 Sheets-Sheet 1

INVENTOR.
FERDINAND C. BUCHANAN
BY Alfred R. Fuchs
ATTORNEY.

June 13, 1939.  F. C. BUCHANAN  2,162,367
COMBINATION TANK AND DELIVERY BODY
Filed Dec. 9, 1937  3 Sheets-Sheet 2
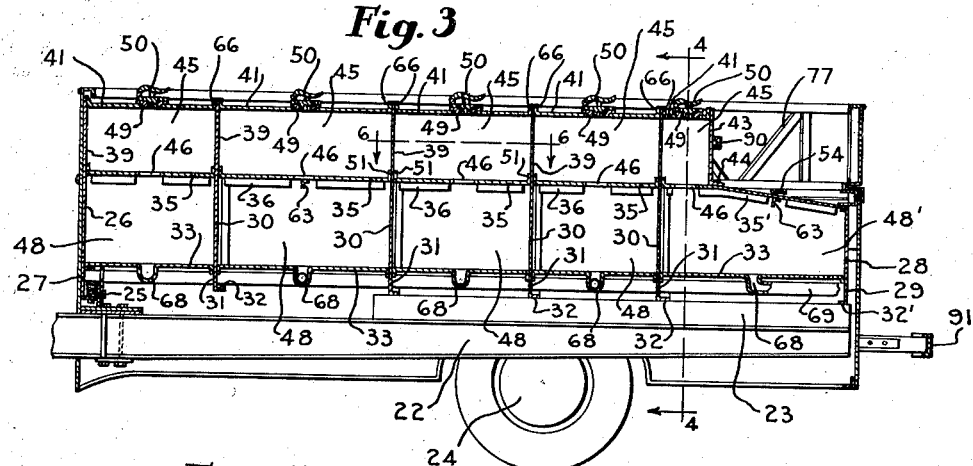
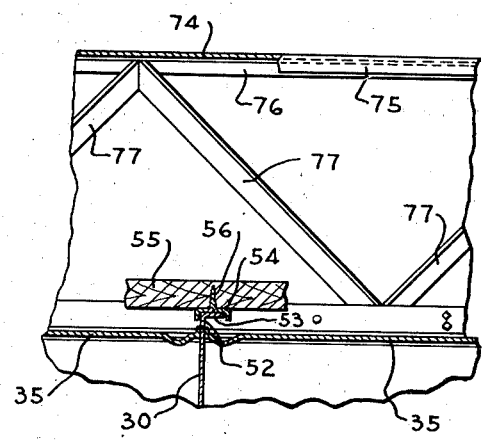
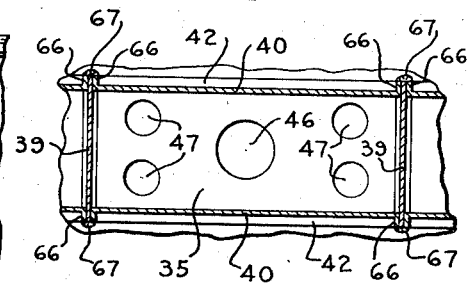
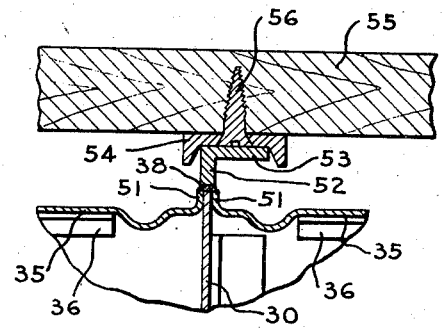
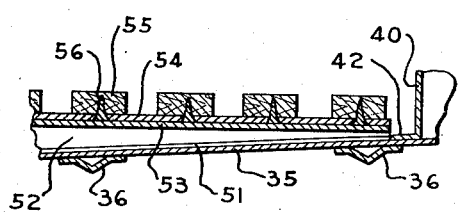
INVENTOR.
FERDINAND C. BUCHANAN.
BY Alfred R. Fuchs
ATTORNEY.

June 13, 1939.   F. C. BUCHANAN   2,162,367
COMBINATION TANK AND DELIVERY BODY
Filed Dec. 9, 1937    3 Sheets-Sheet 3
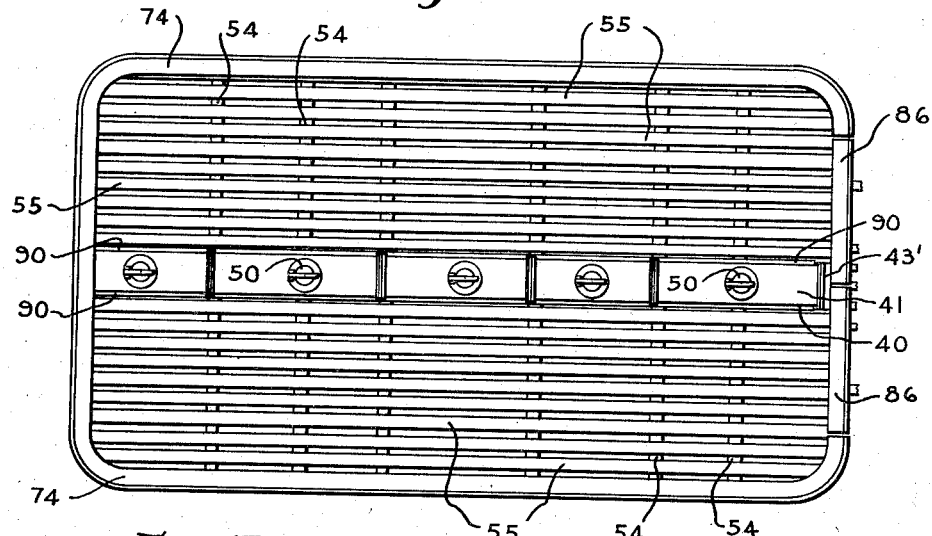
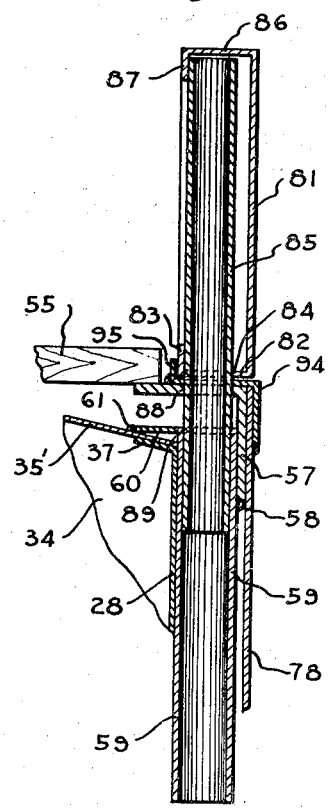
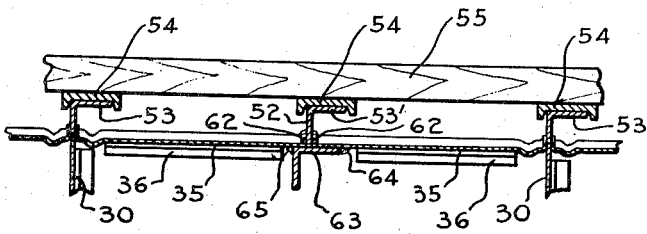
INVENTOR.
FERDINAND C. BUCHANAN
BY Alfred R. Fuchs
ATTORNEY.

Patented June 13, 1939

2,162,367

UNITED STATES PATENT OFFICE 2,162,367

COMBINATION TANK AND DELIVERY BODY

Ferdinand C. Buchanan, Kansas City, Mo., assignor to Andrew A. Kramer, Kansas City, Mo.

Application December 9, 1937, Serial No. 178,923

8 Claims. (Cl. 280—5)

My invention relates to vehicle tank bodies, and more particularly to a combination tank and delivery body.

Combination tank and delivery bodies, such as shown in my co-pending application Serial No. 732,235, filed June 25, 1934, have a tank portion, due to the structure of such bodies, that is shallow and wide, and thus said tank portion has a very large top surface area, which approaches a horizontal plane, if it is not actually in a horizontal plane. Due to this fact and due to the fact that such bodies are mounted on vehicles that are operated on roadways, or similar surfaces, which are never absolutely level, much difficulty is experienced with the pocketing of air and gases in the upper portions of these bodies, interfering with the proper filling thereof. Vehicle tank bodies are usually made with a plurality of compartments and these compartments are made of a certain definite capacity, so that by filling the compartment completely full, a certain definite number of gallons of gasoline or similar liquid can be delivered without using any measuring means at the delivery point to determine the number of gallons that are discharged from that compartment, provided, of course, that a compartment full of the liquid is emptied at such delivery point. Accordingly, if air is trapped in the compartments, it interferes with this function of the compartments and will cause short measure to be delivered, if the capacity of the compartment is relied on for measuring the quantity of gasoline, or other liquid, that is delivered.

It is accordingly a purpose of my invention to provide a tank that will avoid these difficulties existing in tanks, such as described above, or any other vehicle tank that is of large top surface area. Particularly my invention relates to tank bodies that have flat top wall portions, or substantially flat top wall portions, that are plane faced, or substantially plane faced. In order to avoid the difficulties encountered, due to the large surface areas of the top wall portions of tanks used in combination bodies, and tanks of similar character, because of entrapment of air in the upper portion of said tank at points remote from the filling means for said tank, I have provided a top wall portion for such tanks that is inclined and yet rectilinear, being either plane faced or of a substantial conical character, as referred to below, and to provide means for filling said tank and venting said tank at the highest point thereof.

It is a further purpose of my invention to provide a tank body of the above mentioned character, that has an upward extension running longitudinally of said tank portion and communicating with the tank portion, said upward extension serving as an expansion chamber, and venting means, as well as means through which the tank is filled. Vehicle tank bodies are ordinarily divided into compartments, and in a combination body that has an upper freight carrying portion and a lower tank portion, these compartments are usually of greater transverse dimension than longitudinal dimension, and the entrapment of air is particularly hard to avoid in such bodies, because the top wall must be nearly, if not actually, flat. In such bodies the upward extension referred to intersects all of the compartments and communicates with all of the same and is, preferably, divided into a plurality of chambers corresponding to the tank compartments, so that there is no communication between the various tank compartments through said upward extension, or expansion chamber, but each portion of the expansion chamber acts as an expansion chamber for a particular compartment.

It is a further purpose of my invention to provide a new and improved mounting for freight supporting means on said tank body that is supported principally by the partitioning means dividing the tank into compartments, and which is so constructed and arranged that the freight supporting means has its top surface lying substantially in a plane, compensating for the inclination of the top wall of the tank body, so that even though said top wall is inclined, the top surface of the freight supporting means will be substantially parallel to the surface upon which the wheels of the vehicle are supported.

It is another purpose of my invention to provide a tank body in which the longitudinally extending upward extension does not extend the full length of the freight carrying portion, so as to leave a space that does not have any such upward extension between the upstanding side walls, or freight confining means, and an upstanding end wall on said freight carrying portion, whereby the manipulation of boxes, or other containers, in the upper freight carrying portion is facilitated. The upwardly extending portion on the tank that serves as the expansion chamber and venting and filling means, also is provided to act as load dividing means, and where it is desired to divide the load into two parts, the upward extension is located at the longitudinal center of the upper freight carrying portion and, preferably, extends the full length thereof, so as to completely divide said load supporting portion into two compartments.

It is a specific purpose of my invention to provide a combination body, in which the lower tank portion slopes toward the upward extension thereon from a plurality of directions, and in the case in which the upwardly extending longitudinally arranged combination expansion chamber and filling and venting means is of less length than the tank portion, the end compartment, that is vented by means of an upward extension that does not extend the full length thereof, is, preferably, sloped not only transversely of the tank body at the top wall thereof, but also lengthwise thereof, having a substantially conical top wall portion sloping upwardly to the upward extension, through which filling is accomplished.

In all forms of my invention it is an important purpose of my invention to provide maximum strength for the tank body portion by reinforcing the same and by inclining the top wall portions toward the longitudinal center line of the tank body, so that said inclined wall portions tend to brace each other, and to have said inclined wall portions continuous from one side wall to the other side wall of the tank, the upward extension being mounted on top of said top wall and said top wall being provided with openings to provide communication between the chamber formed in said upward extension and the tank compartment under said top wall. Thus the upward extension stiffens the central portion of the top wall in a vertical direction and does not cause any weakening of the same in a transverse direction, as is true if the material of the top wall is merely offset upwardly to form an upward extension.

It is also a purpose of my invention to provide new and improved means for mounting a detachable gate, or upstanding wall portion, for the upper freight carrying portion of the body, so that socket means for receiving extensions on said removable gate, or wall portion, are provided, that are entirely outside the tank portion and between a skirting on said tank portion and said tank portion, thus preventing any possibility of any leakage of liquid into said socket portions.

Other objects and advantages of my invention will appear as the description of the drawings proceeds. I desire to have it understood, however, that I do not intend to limit myself to the particular details shown or described, except as defined in the claims.

In the drawings:

Fig. 3 is a longitudinal sectional view through said body, mounted on a vehicle frame, the forward end of the vehicle frame being broken away.

Fig. 5 is a fragmentary longitudinal sectional view, on an enlarged scale, partly broken away, through the upper portion of the tank, showing part of the side wall in elevation.

Fig. 6 is a fragmentary section taken substantially on the line 6—6 of Fig. 3.

Fig. 7 is a vertical sectional view on an enlarged scale, showing the endgate mounting and a fragment of the adjacent portion of the tank body and freight supporting means.

Fig. 8 is a top plan view of a slightly modified form of my invention.

Fig. 9 is a fragmentary transverse sectional view, on an enlarged scale, through the top wall of the tank portion and the freight supporting means mounted thereon.

Fig. 10 is a fragmentary section, on a still larger scale, taken substantially perpendicular to Fig. 9, and Fig. 11 is a longitudinal sectional view, on an enlarged scale, taken substantially on the line 11—11 of Fig. 2.

Figure 1:
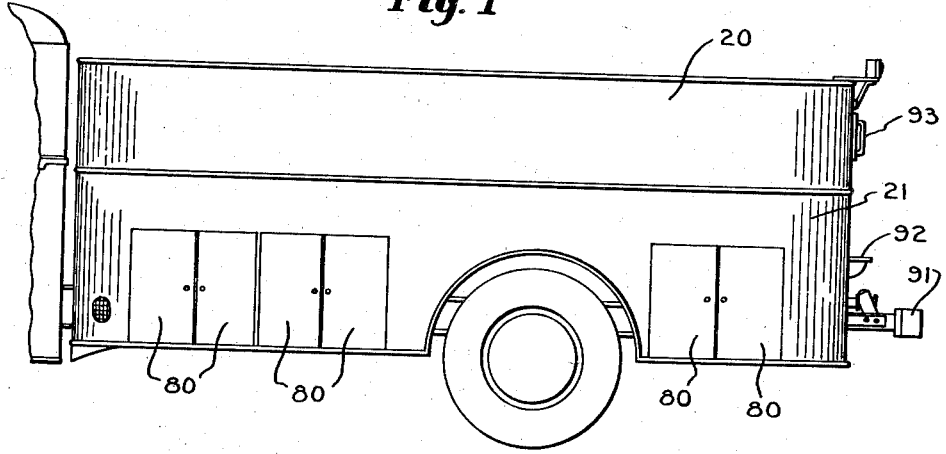
Fig. 1 is a side elevation of my improved vehicle body, applied to a truck, the forward portion of which is broken away.

While my improvements are shown as being applied to a truck tank, the same are equally applicable to any vehicle tank, whether mounted on a truck frame or utilized as a trailer, or semitrailer.

Referring in detail to the drawings, my combination vehicle body comprises an upper body portion 20 and a lower tank portion 21. The combination body is shown as being mounted on a vehicle having longitudinal frame members 22, upon which sills 23 may be mounted for supporting the tank body over the rear wheels 24. The forward end of said body is provided with a pivotal mounting on the vehicle frame, which is indicated generally by the numeral 25, the pivot member being mounted on the central longitudinal axis of the vehicle body, whereby a mounting that is substantially a three-point support is provided for the vehicle body. The forward end of the vehicle body is provided with a transverse wall 26, which acts as the forward head of the tank portion, and which has an integral extension 27, by means of which the pivotal mounting of the forward end of the tank on the vehicle frame is obtained. The rear transverse wall, or head, 28 of the tank, is similarly extended at 29 and the intermediate transverse walls, or partitions, 30 are provided with similar extensions 31, which are provided with flanges 32, thus providing what are substantially bolsters, or transverse supporting members, under the tank body, integral with the partitions, certain ones of which rest upon the sills 23, the extension 29 on the rear head 28 also having a flange 32' that is mounted on said sills to support said tank body.

It is, of course, to be understood that the transverse walls 30 may be located at any desired points to obtain the desired length of compartments for the tank body, to get the desired capacity therefor.

The shell of the tank portion of the combination body comprises a curved bottom portion 33, which merges with a substantially vertical side wall 34 at each side of the tank portion, said shell portion further having a top wall 35, which inclines upwardly from the side walls 34 to substantially the longitudinal center line of said top wall, the highest point of said top wall, preferably, lying on the longitudinal center line of the tank. In order to provide strength and stiffness for said top wall 35, it is provided with V-shaped reinforcing ribs 36, running lengthwise thereof, having flanges thereon welded to the inner face of said wall 35, and in order to obtain a strong welded joint, the side wall portions 34 of the shell are flanged inwardly at 37 and are welded to the inner face of the top wall 35, as well as to the longitudinal edge of the top wall.

The shell is, of course, made in sections and the welds between the transverse wall portions 30 and the top, side and bottom walls of the shell portion of the tank are made on the exterior of the shell, as indicated at 38 in Fig. 10.

Figure 4:
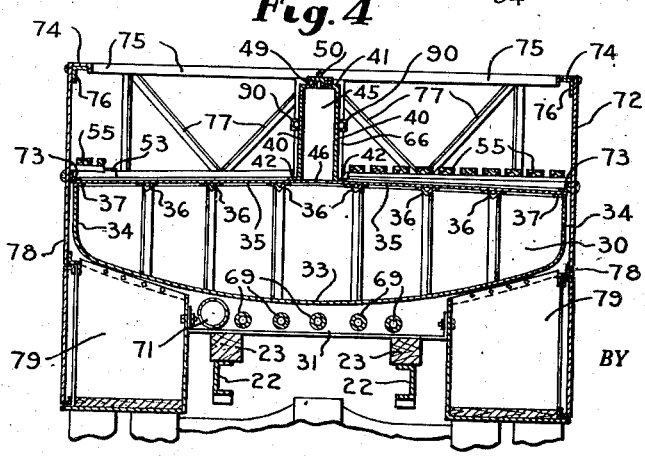
Fig. 4 is a section taken on the line 4—4 of Fig. 3.

The transverse walls 30 and the forward head 26 have upward extensions 39, as will be evident from Figs. 3 and 4. The tank portion is provided with an upward extension having the longitudinally extending side walls 40 and the top wall 41, the top wall being integral with said side walls and said side walls having bottom flanges 42 that are welded to the top wall 35 of the tank portion. In the form of the invention shown in Figs. 2, 3 and 4, a curved rear wall 43 is provided, joining the side walls 40 and having a flange 44, similar to the flanges 42, that is welded to the top wall of the tank. It will be obvious that the wall 43 and the transverse walls 39 divide the upward extension on said tank portion into a plurality of compartments 45.

The top wall 35 of the tank portion of my improved combination vehicle body is provided with a large central opening 46 and a plurality of openings 47 adjacent the corners of the compartments 45, to provide communication between the tank compartments 48 and the expansion chamber compartments 45. Thus each expansion chamber 45 communicates with a tank compartment 48 and is adapted to vent said compartment, no matter what position the tank may be in, this being due to the fact that venting can be obtained through the opening 46 or any one of the openings 47, no matter whether the tank is inclined longitudinally or transversely, the tendency of any air or gases in a compartment being to travel up the inclined top wall 35 to an opening 47 or the opening 46, and through said opening, or openings, into the chamber 45 associated with said compartment. Inasmuch as the rear expansion chamber 45 is short, usually only the central opening 46 is provided therein, and, preferably, the top wall 35' of the rear compartment 48' of the tank is also sloped longitudinally, as well as transversely, thus having what is approximately a conical shape, so as to slope upwardly from both the rear end wall 28 toward the expansion chamber 45 and the side walls 34 toward said expansion chamber 45. The V-shaped bracing members 36 do not interfere with the action of the top wall in permitting the air or other gases in the tank compartments, to travel up the same because the size of these is not as great as shown in the drawings, these being somewhat exaggerated in size, of necessity, in showing the same, and because these can be interrupted, terminating short of the end walls of the compartments, as well as being slightly interrupted at the central portions thereof, if desired, so that the gases can pass upwardly along the wall 35 to the openings 46, as will be clear from the drawings. The top wall 41 of each chamber 45 is provided with a fill opening at 49, provided with any suitable closure member 50, which is removable for filling the tank compartment with which the chamber 45 communicates, and which may be provided with any suitable venting means, one form of vent being shown in the drawings, although any desired venting means can be used.

Upon reference to Figs. 5 and 10, particularly, it will be noted that the partitions 30 are welded to outwardly extending flanges 51 on the top wall portions 35 of the tank body and that mounted on and welded to the upwardly projecting seam, thus produced, are the depending legs 52 of the angle members 53, which serve as supports for the load supporting members comprising the inverted channel members 54, which rest on the angle members 53 and the longitudinally extending slat-like members 55, which may be of wood, or similar material, and are secured to the channel members 54 by means of screw-threaded securing elements 56. The freight supporting means comprising the members 55 is thus mounted directly on the upwardly extending portions of the transverse walls 30, and, of course, also on the forward head 26 and the rear head 28. The mounting on the rear head 28 is shown in Fig. 7, in which an angle member 57 is shown, which supports the ends of the members 55 and which is welded at 58 to a tubular member 59, which, in turn, is welded to the plate 60 that is welded to the top wall 35' at 61, and which tubular member is also welded to the rear head 28 of the rear compartment 48'.

It may be desirable to provide additional supporting means for the load supporting, or freight supporting, means comprising the members 55 and channel members 54 on longer compartments, due to the fact that the span between the partitions 30 may be greater than is desirable for the proper support of the load, by means of the members 55. In such longer compartments the arrangement shown in Fig. 11 is provided, in which additional channel members 54 are provided between the partitions 30, which engage angle members 53', but instead of engaging the top edges of the partitions 30 where the same extend through the top of the shell of the tank, these are welded to the top wall 35 of the shell at 62, said shell being provided with an internal transverse bracing means comprising an angle member 63, which is welded to said top wall 35 at 64 and 65. Such additional channel members 54 and bracing means 63 are shown as being provided in the rear compartment and the second compartment from the front in the tank body shown in Figs. 2, 3 and 8, one of the angle members 53' being shown in Fig. 2 where the flooring or freight supporting means is broken away. It will thus be noted that the freight carried by the freight supporting means in the upper freight carrying portion of the body is thus supported directly on the vehicle frame through the sills 23 and the rocking mounting at 25, through the extensions 27 and 31 on the partitions, or transverse walls, 30 and the head 26, as well as the extension 29 on the head 28, and that thus the load supported on top of the tank is not supported by the bottom wall of the tank nor by the top wall thereof, except in the longer compartments, but is largely supported by the partitioning means and heads of the tank, thus taking the load off the shell and permitting the tank body to function substantially in the same manner as if there were no load mounted on the top wall thereof, as far as any stresses on the shell of the tank are concerned.

It will be noted that the tank portion of the vehicle is of a substantially semi-rectangular and semi-elliptical cross section, the lower portion thereof being semi-elliptical, and thus giving greater strength to the tank body, where the major portion of the weight of the liquid would be applied to the shell. Due to the inclined, self-bracing character of the top wall of the tank and the stiffening means provided therefor, said top wall is of much greater strength than would otherwise be the case, particularly, because of the upward extension provided at the center thereof. Said upward extension stiffens the top wall and as said top wall 35 runs through said extensions, the central portion of said top wall is by far the stiffest and strongest portion of said top wall, the longitudinally upwardly extending chamber having the vertical walls 40, which provide a beam-like stiffening means at the longitudinal center of said top wall. The side walls 40, as well as the top wall 41 of the upward extension, are provided with outwardly directed flanges 66 at the marginal portions thereof adjacent the extensions 39 of the partitions 30, as well as at the rear wall 43, and the extension 39 on the forward head 26, and said extensions 39 forming partitions dividing the upwardly extending chamber into the compartments 45 extend outwardly beyond the walls 40 and 41, so that the welds 67 providing fluid-tight joints between said flanges and the edges of said partitions 39 are located exteriorly of said upward extension.

It is highly desirable that the load carrying means has a top surface that is substantially horizontal when the vehicle is standing on a horizontal support, or in other words, that the top surface of the members 55, taken collectively, is parallel to the supporting surface for the vehicle. This is accomplished by providing the depending flange portions 52, on the members 53 and on the members 53', with a taper, so that the shortest part thereof is at the top portion of the inclined wall 35, and the longest or deepest portion thereof is adjacent the side edge of the tank body, said members 52 being tapered so as to compensate for the inclination of the top wall 35, the seam at the top edge of the partition 30 at each joint, of course, inclining substantially in the same manner as the adjoining top wall portion 35.

Figure 2:
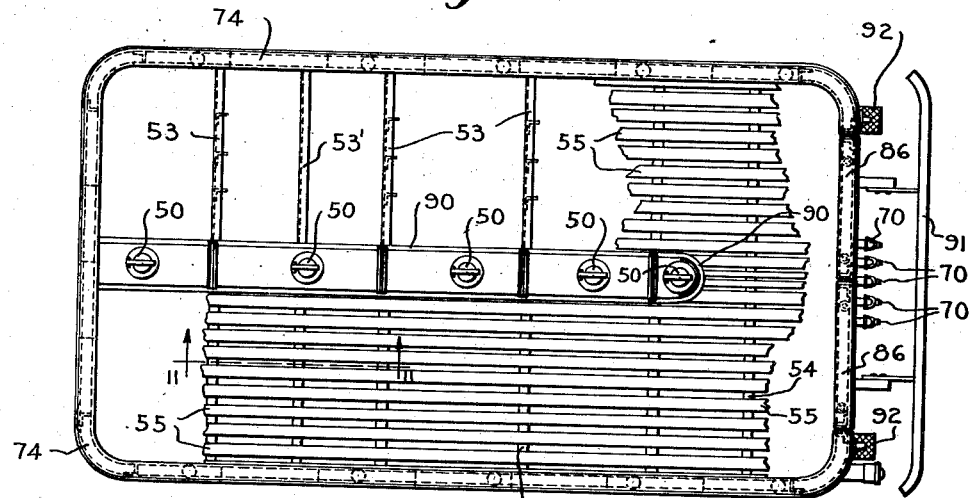
Fig. 2 is a top plan view of my improved vehicle body, a portion of the freight supporting means being broken away.

Instead of providing an upward extension that terminates short of the rear end of the rear compartment of the tank, as shown in Figs. 2 and 3, the upward extension can be made as shown in Fig. 8, in which the top wall 41 thereof and the side walls 40 are shown as extending to the rear end of the tank body, the rear wall 43' being an upward extension of the rear head 28 of the tank, just as are the upwardly extending portions 39 of the partitions 30. Otherwise the construction of the tank body shown in Fig. 8 is the same as that shown in Fig. 2, except for the fact that there is no longitudinally inclined wall portion 35', the walls of the rear compartment inclining exactly in the same manner as those of the other compartments of said tank body, that is, these are plane faced and inclined transversely of the tank body only. Any suitable outlet means for the compartments can be provided, such as the sumps 68, from which the pipe lines 69 lead, said pipe lines 69 extending through the extensions 31 on the partitions and through the extensions 27 and 29 on the heads and being welded thereto, to provide bracing means for the tank structure. Any suitable means for controlling the discharge pipe lines can be provided, such as the faucets 70 shown at the rear end of the tank body, these being omitted in Fig. 3, as the pipe lines 69 are broken away in said figure. A hose tube 71 may also be provided, extending through the extensions 31, 27 and 29, and welded thereto for receiving a hose or similar member, the hose tube being also, preferably, welded to the extended partitions and heads.

The top wall 35 of the tank has the upstanding marginal walls 72 of the upper freight carrying portion of the body secured thereto, preferably, by means of angle members 73, which are welded to said top wall 35 and extend outwardly beyond the margins of the top wall, as is evident from Fig. 4. Any suitable bracing means for said marginal walls may be provided, such as the lateral top flanges 74 having the depending flanges 75 thereon, reinforced by the angle members 76, and further reinforced by obliquely extending angle members 77 extending from adjacent the bottom edge of the wall 72 to the reinforced top edge thereof. A skirting 78 is, preferably, provided, which may be also mounted on the angle members 73 to depend therefrom, and suitable compartments 79 for receptacles may be provided, which may have doors, such as the doors 80. Any desired arrangement of compartments and doors that may be desired may be provided.

Preferably, at one or more points, means are provided for detachably mounting a portion of the marginal or confining wall in position to provide removable endgate members. In the drawings such removable endgate members are shown at the rear end of the combination body in both forms of the invention. Said endgate members are provided with vertical outer walls 81, with inwardly directed flanges 82 at the bottom thereof and upwardly extending flanges 83 on said bottom flanges, openings 84 being provided in said bottom flanges, through which tubular members 85 extend, said tubular members being welded in position in said openings and extending upwardly to the top horizontal flange 86 on said endgate member, which has a depending flange 87, to which the upper end of the tubular member 85 is welded. Said tubular members 85 extend downwardly through openings 88 in the angle member 57 and through an opening 89 in the plate 60, in which the tubular member 59 is welded, and into the tubular member 59 a substantial distance, so as to rigidly hold the endgate members detachably in position. It will be noted that said arrangement provides a mounting for the detachably mounted endgate members between the skirting 78 and the tank wall 28, thus locating the sockets for mounting the endgate members detachably in position entirely outside the tank body and preventing any escape of fluids into the socket members from any tank compartment that contains liquid.

Means is provided for preventing any containers, that may be placed on the freight supporting means 55, from damaging the upstanding walls 40 of the upward extension on the tank portion, said means comprising channel members 90 that have the flanges thereof welded to said upstanding walls, providing rub rails thereon that prevent the engagement of boxes, barrels, or other containers, with said upstanding walls. Of course, any desired bumper 91 and step means 92 can be provided, said bumper being so mounted as to protect the faucets 70 and the steps being provided at a convenient point for entrance into the upper body portion above the top of the tank. Any suitable handles 93 can be provided on the rear upstanding wall portion of the upper body portion 20. An angle 94 is provided, that embraces the top edge of the skirting 78 below the endgates, being welded to the skirting and to the angle member 57, and having an upstanding lip portion 95 that acts both as a stop for the load supporting means 55 and the endgate members.

What I claim is:

1. In a vehicle, a combination tank and freight body comprising a lower tank portion and an upper freight carrying portion, said upper freight carrying portion having marginal walls, said lower tank portion having a top wall having oppositely transversely inclined substantially plane portions and an upward extension running longitudinally of said tank portion at the highest elevation of said top wall portions, and communicating with said lower tank portion, said extension lying within said freight carrying portion and cooperating with said marginal walls to confine the freight carried therein.

2. In a vehicle, a combination tank and freight body, comprising a lower compartment tank portion and an upper freight carrying portion, said tank portion being wide and shallow and being provided with transverse partitioning means dividing the same into a plurality of compartments, said compartments having top walls inclined transversely of said body and said tank body having an upward extension thereon extending lengthwise of said tank portion and intersecting each of said compartments at the highest portion of the top walls thereof, said compartments communicating with said upward extension, and each compartment having filling means in said extension.

3. In a vehicle, a combination tank and freight body, comprising a lower compartment tank portion and an upper freight carrying portion, said freight carrying portion overlying said tank portion, said tank portion being partitioned to divide the same into a plurality of transversely extending compartments, said tank portion having an upward extension thereon extending lengthwise of said body from the forward end thereof to a point over the rear compartment of said tank portion, but short of the rear end of said body, said upward extension being spaced from the side margins of said freight carrying portion to divide the load except at the rear end of said body.

4. In a vehicle, a combination tank and freight body, comprising a lower compartment tank portion and an upper freight carrying portion, said tank portion being wide and shallow and being provided with transverse partitioning means dividing the same into a plurality of compartments, said compartments having top walls inclined transversely of said body and said tank portion having an upward extension thereon extending lengthwise of said tank portion and intersecting each of said compartments at the highest portion of the top walls thereof, said partitioning means extending into said upward extension to divide the same into sections corresponding to said tank compartments, said tank compartments communicating with the sections of said extension, each section having a fill opening therein, and closures for said fill openings.

5. In a vehicle, a combination tank and freight body, comprising a lower compartment tank portion and an upper freight carrying portion, said tank portion being provided with transverse partitioning means dividing the same into a plurality of compartments and extending upwardly beyond the top wall of said tank portion, and freight supporting means mounted on the extended portions of said partitions and spaced from said top wall.

6. In a vehicle, a combination tank and freight body comprising a lower tank portion and an upper freight carrying portion, said tank portion having an inclined substantially plane top wall and filling and venting means for said tank portion, and freight supporting means mounted on top of said tank portion comprising frame members tapering in height to compensate for the inclination of said top wall whereby the top surface of said freight supporting means lies substantially in a plane parallel to the supporting surface of the vehicle.

7. In a vehicle, a combination tank and freight body comprising a lower tank portion and an upper freight carrying portion, said tank portion ending short of the rear end of said freight carrying portion, a skirting depending from said freight carrying portion spaced from the rear wall of said tank portion, upstanding walls on said freight portion including a removable rear section, sockets mounted between said skirting and the rear wall of said tank portion and members on said removable rear section extending into said sockets to detachably mount said rear section in position.

8. In a vehicle, a combination tank and freight body, comprising a lower tank portion and an upper freight carrying portion, a skirting depending from said freight carrying portion spaced from the wall of said tank portion, upstanding walls on said freight portion including a removable section, sockets mounted between said skirting and the wall of said tank portion and members on said removable section extending into said sockets to detachably mount said section in position.

FERDINAND C. BUCHANAN.